United States Patent [19]

Askins et al.

[11] 4,406,082
[45] Sep. 27, 1983

[54] TRIGGER MECHANISM FOR ROTATING FRAME ANIMAL TRAPS

[75] Inventors: William E. Askins, Lititz; John P. Trauger, Willow ST, both of Pa.

[73] Assignee: Woodstream Corporation, Lititz, Pa.

[21] Appl. No.: 264,072

[22] Filed: May 15, 1981

[51] Int. Cl.³ ............................................. A01M 23/26
[52] U.S. Cl. ...................................................... 43/92
[58] Field of Search ......................... 43/92, 93, 94, 88; 29/513, 515; 403/209, 213

[56] References Cited

U.S. PATENT DOCUMENTS

| 2,947,107 | 8/1960 | Lehn | 43/92 |
| 3,106,036 | 10/1963 | Lehn | 43/93 |
| 4,250,654 | 2/1981 | Souza et al. | 43/88 X |

FOREIGN PATENT DOCUMENTS 1040856 10/1978 Canada ..................................... 43/88

Primary Examiner—John Sipos
Assistant Examiner—Charles L. Willis
Attorney, Agent, or Firm—Holman & Stern

[57] ABSTRACT

An improved trigger mechanism for a rotating frame animal trap includes a single plate which is bent along its transversely extending center line and includes end portions which are contoured to rotatably engage one of the side portions of a trap frame. Spaced holes defined through the plate along the center line receive respective prongs of a two-prong bent wire trigger arm which is supported by the folded plate. A tab is cut in the plate and bent out of plane to serve as a wedge for securing the bent wire trigger arm along the center line. Cut-out portions from opposite ends of the plate in the region of the contoured portions provide exposure of the surrounded frame portion side to permit a latching mechanism, which is pivotally secured to another frame, to releasably engage the exposed portion of the frame on which the trigger mechanism is supported. The trigger mechanism is constructed for release when the trigger arm is engaged by an animal from any direction.

12 Claims, 5 Drawing Figures

U.S. Patent  Sep. 27, 1983  4,406,082
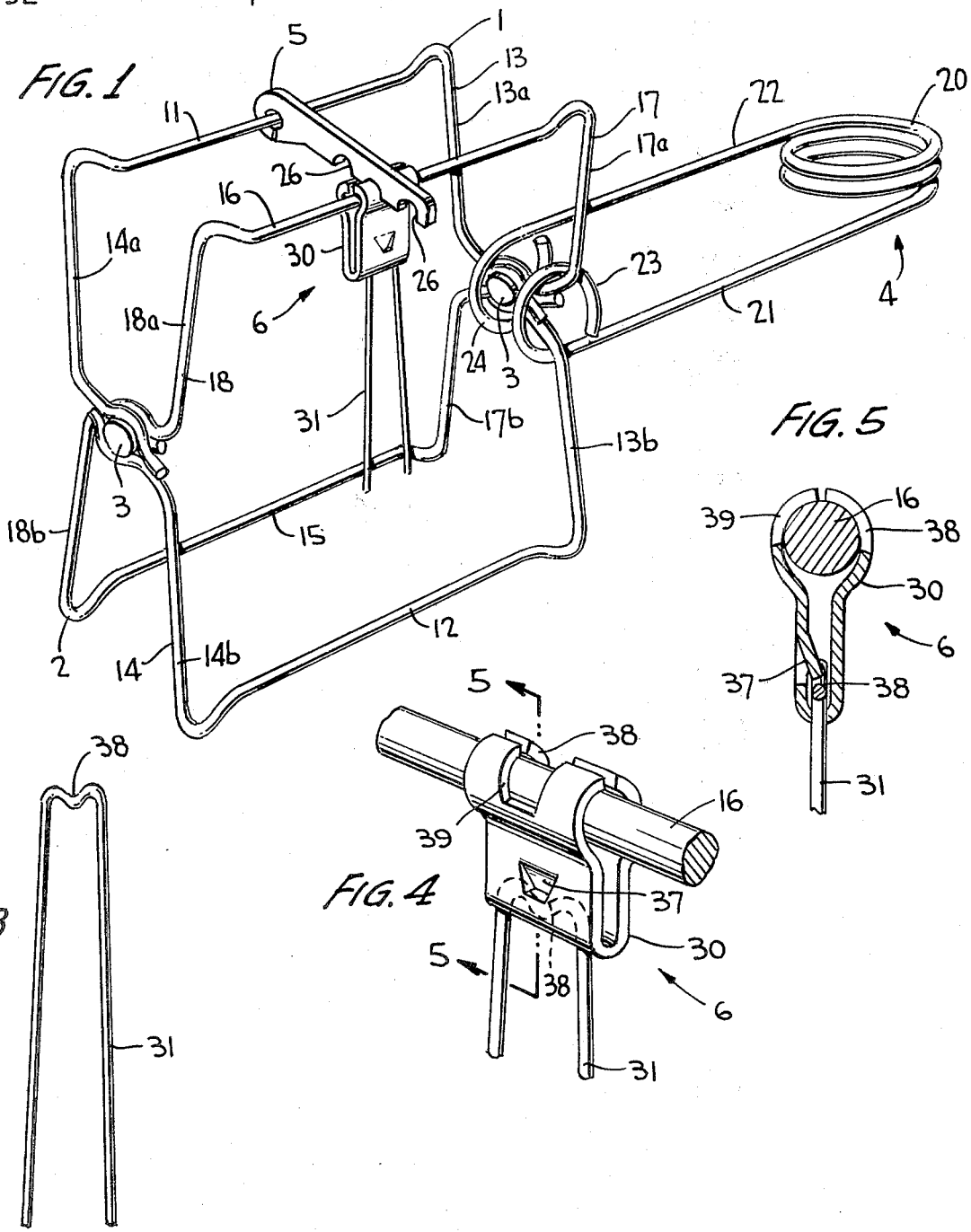

TRIGGER MECHANISM FOR ROTATING FRAME ANIMAL TRAPS

TECHNICAL FIELD

The present invention relates to animal traps of the rotating frame type and, more particularly, to an improved trigger mechanism for such traps.

BACKGROUND OF THE INVENTION

Rotating frame animal traps have long been used in the humane trapping of fur-bearing and other animals. As is well known in the art, a rotating frame trap typically comprises a pair of similar frames, which frames can be of a generally square, rectangular, or part trapezoidal shape. The frames are pivotally connected at adjacent ends for relative rotation about a common axis. Two pairs of coacting jaws are thereby formed by the sides of the frames. At least one actuator, consisting of a coil spring having arms terminated in closed rings slidable along and encircling one set of the adjacent ends of the frames, is used to urge the jaws toward a closed position and, when the trap is sprung, to maintain said jaws in a closed position. A rotating frame trap of this type is described and illustrated in U.S. Pat. No. 3,426,471 (Lehn), the disclosure from which is incorporated herein by reference. In such a trap, the ends which cooperate with the rings are shaped so that, in the set position of the trap, these ends lie substantially parallel to one another. The central portions of the ends, near the common axis of the frames, form a cross within the rings on the arms of the coil springs. Trigger mechanisms useful with rotating frame traps maintain the frames of the traps in an open position when the traps are set. The frames are released when the traps are sprung in order to permit, as a result of the action of the spring and the rings on the end of the actuator, rapid rotation of the frame through an angle of approximately 90°. The jaws of the trap thus quickly strike and kill an animal in the trap.

Commonly used trigger mechanisms, such as that described in the aforementioned Lehn patent, comprise a pair of prongs adapted to project inwardly towards the center of an open, set trap. The prongs are fixedly connected to a sleeve rotatably connected to one of the sides of one of the frames of the trap. A bar is rotatably mounted on the adjacent side of the other trap frame opposite the sleeve and has one or more notches formed therein which are adapted to releasably engage the sleeve and thereby releasably hold the trap frames in open set position against the bias of the actuator. When the prongs are moved forward or backward in a plane essentially perpendicular to the plane of the trap (for example, by an animal passing through the open trap) the prongs rotate the sleeve and thereby dislodge the bar to permit the trap to close.

The two-pronged trigger arm described and illustrated in the Lehn patent is formed from a bent wire which is fixed at its bend to a flat portion of one of two members of the trigger sleeve. The trigger sleeve is formed of two similar members, each having a generally semi-cylindrical portion and a flat portion. The two members are joined together by the rivets which hold the bent wire to the flat portion of one of the members, the two members being joined about the side of one of the trap frames. The overall trigger mechanism, therefore, includes three parts, namely, the two sleeve members and the bent wire trigger arm.

We have found that during manufacture of the trap, particularly during the assembly of the trigger device onto the frame, the Lehn-type trigger mechanism described above is quite disadvantageous. Specifically, it becomes relatively time-consuming to join the two sleeve members together with rivets while making sure that the bent wire is also being secured by those rivets to the flat portion of one of the sleeve members. In addition, we have found that replacement of the bent wire trigger arm, should it break, by a trapper or other user of the trap, is extremely difficult in view of the use of rivets to hold the entire trigger mechanism together. Specifically, in order to replace the bent wire, the trapper would have to disengage the rivets which hold the bent wire and the two sleeve members together. This disengagement is of itself difficult; of greater difficulty is reassembly of the three elements by means of the rivets.

SUMMARY OF THE INVENTION

It is therefore a primary object of the present invention to provide an improved trigger mechanism for rotating frame animal traps. More specifically, it is an object of the present invention to provide such a trigger mechanism which is simple to assemble and permits the bent wire trigger arm to be easily replaced in the field.

In accordance with the present invention, the two sleeve members of the prior art trigger mechanism is replaced by a single stamped plate having a generally rectangular profile in plan. Opposite ends of the plate are contoured out of the plane of the plate to match the peripheral contour of one side of the rotating frame trap. Two through holes are defined through the stamped plate at spaced locations along the transverse center line of the plate. A tab or flap is cut in the plate and bent out of plane toward the concave side of the plate end portions. The two through holes in the plate are adapted to receive respective arms of the bent wire trigger arm such that the bent portion of the trigger arm resides along the transverse center line of the plate with its arms extending therethrough. The plate is then folded along its transverse center line such that the contoured end portions come together around one of the side portions of the trap with the trigger arms depending therefrom through the holes. The tab or flap projects inwardly between the two halves of the folded plate to contact and firmly engage the bent wire trigger arm in its position between the two folded plate halves. A portion of each of the contoured ends of the plate is cut away so as to expose part of the trap side portion which is otherwise surrounded by the contoured ends of the plate. A latch arm is pivotally mounted on the opposite side portion of the trap and is notched along one of its edges so as to permit engagement of the opposite trap side portion by the notch through the cut-away portion of the contoured ends of the stamped plate. When the trap is set, the trigger arms project inwardly toward the center of the open trap so as to be rotatable by an animal passing through the trap about the arm surrounded by the folded plate. Rotation of the trigger arms and the folded plate dislodges the notched latch bar from the trap side and permits the biased frame members to close on the animal.

The present invention, as described, utilizes a single stamped plate in place of the two sleeve members employed in the prior art Lehn device. The bent wire trigger arms are held in place by the folded single stamped plate, eliminating the need for rivets and thereby facilitating initial assembly and replacement of the bent wire trigger arms in the field.

BRIEF DESCRIPTION OF THE DRAWINGS

The above and still further objects, features, and advantages of the present invention will become apparent upon consideration of the following detailed description of a specific embodiment of the invention, especially when taken in consideration with the accompanying drawings, wherein:

FIG. 1 is a view in perspective of a trap of the present invention in its set position;

FIG. 2 is a plan view of the stamped metal plate employed as part of the trigger mechanism of the trap of FIG. 1;

FIG. 3 is a plan view of the bent wire trigger arm portion of the trigger mechanism of the trap of FIG. 1;

FIG. 4 is a detailed view in perspective of part of the trap of FIG. 1 showing the trigger mechanism assembled onto the trap; and FIG. 5 is a view in section of the trigger mechanism of the present invention taken along lines 5—5 of FIG. 4.

DESCRIPTION OF THE PREFERRED EMBODIMENTS

Referring to the drawings in greater detail, a rotating frame animal trap, such as a trap of the type described in the aforementioned Lehn patent, comprises two jaws 1 and 2 pivotally secured to one another by means of pivots 3. The trap further includes a spring 4 for actuating the jaws 1 and 2, a latch arm 5 for holding the jaws in set position and a trigger 6 for releasing the latch and permitting the jaws to close. Jaws 1 and 2 are similar and may be identical to one another and preferably take the form of hollow frames, each having opposite side portions and connecting end portions, therefore, jaw 1 is shown as comprising side portions 11 and 12 and end portions 13 and 14. Jaw 2, on the other hand, includes side portions 15 and 16 and end portions 17 and 18. The jaws are conveniently made from strip or wire stock bent to provide the desired shape. For convenience and economy of manufacture, the jaws are shown as being made up of two halves which are braised or welded together. In other words, jaw 1 is illustrated as having one half comprising the side portion 11 and end portion 13a and an opposite end portion 14a. The second half of jaw 1 comprises the side portion 12, and end portion 13b and an opposite end portion 14b. End portions 13a and 13b form part of the overall jaw end portion 13; likewise, end portions 14a and 14b form a part of the overall jaw end portion 14. The proximate ends of end portions 13a and 13b are bent to substantially conform to part of the circumferential periphery of one of the pivots 3 and to reside in diametrically opposed positions about that pivot in co-planar relationship. The extreme ends of end portions 13a and 13b extend a short distance beyond the pivot 3 where they are braised or welded to the other end portion 13b and 13a, respectively. A similar relationship exists between end portions 14a and 14b of jaw 1. Jaw 2 is constructed in a similar manner with end portions 17a and 17b and 18a and 18b being provided for end portions 17 and 18, respectively.

Pivots 3, which serve as the connections between jaws 1 and 2, take the form of pivot pins or shafts with suitable end flanges to prevent disengagement from the end portions of the jaws. For convenience and economy of manufacture, the pivot portions 3 may comprise hollow rivets, each having a head portion at one end and a flange portion at the other.

Spring 4 is illustrated in FIG. 1 as comprising a spiral portion 20 consisting of one or more loops and end portions providing arms 21 and 22. An eye or loop 23 formed at the end of spring arm 21 encircles end portions 13b and 17a of jaws 1 and 2, respectively. A similar eye or loop 24, formed at the end of spring arm 22, encircles end portions 13a and 17b of jaws 1 and 2, respectively. When the jaws are in the set position illustrated in FIG. 1, loop portions 23 and 24 are forced inwardly toward pivot 3, as shown, so as to encircle the extreme ends of these individual end portions. The inherent resiliency of spring 4 tends to bias arms 21 and 22 apart, thereby forceably pivoting jaws 1 and 2 from the set position illustrated in FIG. 1 to a closed position (not shown) wherein side portions 16 and 12 are in substantially abutting relationship and side portions 11 and 15 are in substantially abutting relationship. Although the force exerted by the spring 4 is at a maximum when the trap is in its set position illustrated in FIG. 4, the jaws can readily be held in this position since the spring acts on the jaws near the pivot and hence with a short lever arm. As the loops 23 and 24 move outwardly along the end portions of the jaws, the effective lever arm is increased and, moreover, there is an effective wedging action by reason of the angular relation of the end portions of the jaws so that the jaws are urged forceably toward one another and securely hold an animal caught between them. A spring similar to spring 4 may be provided, if desired, at the opposite ends 14 and 18 of the jaws.

The jaws are releasably held in the set position of FIG. 1 by means of latch arm 5 which is pivotally mounted on side portion 11 of frame or jaw 1. Latch arm 5 is freely pivotable about side portion 11 so that, in the set position of the trap, the latch arm underside extends beyond and contacts side portion 16. This underside of latch arm 5 has a plurality of arcuate notches 26 defined therein of slightly greater radius than that of side portion 16 so that the latch, when a notch 26 engages side portion 16 will not slip off of that side portion and release jaw 2 from the set position. The provision of plural notches 26 permits closure of jaws 1 and 2 with greater or lesser force, as desired.

The trap as described to this point is conventional. The present invention resides in the trigger mechanism 6 which includes two parts, namely, a stamped plate 30 and a bent wire trigger arm 31. The stamped plate is illustrated in detail in FIG. 2 prior to its assembly on the trap. Plate 30 has a generally rectangular plan configuration with opposite end portions contoured to match corresponding portions of the circumferential periphery of side portion 16 of the trap. Specifically, end portions 32 and 33 are bent arcuately into the plan of the drawing in FIG. 2 so as to provide concave partial cylindrical portions extending transversely of plate 30. A pair of holes 34 and 36 are defined through plate 30 at spaced locations along the transversely-extending center line of the plate. Holes 34 and 36 are countersunk from the side of plate 30 and visible in FIG. 2 so as to permit the arms of the bent wire 31 to fit therethrough when plate 30 is folded along its transversely-extending center line. A flap or tab 37 of generally trapezoidal configuration is cut along three sides and bent inward (i.e. upward from the plan of the drawing in FIG. 2) at a location along the longitudinally-extending center line of plate 30 between contoured end portion 33 and holes 34 and 36. The converging end of the flap points towards the transversely-extending center line of plate 30.

The bent wire trigger arm 31 of the trigger mechanism 6 is illustrated in detail in FIG. 3. The trigger arm 31 has a generally U-shaped configuration with elongated arm members and a shortened base member. The base member is bent slightly inward (i.e. toward the legs of the U-shaped configuration) proximate its midportion.

The trigger mechanism is assembled by folding or bending plate 30 along its transversely-extending center line while permitting the legs of trigger arm 31 to extend through respective holes 34 and 36 in plate 30. Folding of the plate 30 is continued such that the contoured portions 32 and 33 are positioned on opposite sides of side portion 16 of the trap frame 2 and such that the base portion of the U-shaped bent wire trigger arm 31 extends between holes 34 and 36 along the transversely-extending center line. Bending is terminated when the contoured portions 32 and 33 of plate 30 engage side portion 16 in a manner such that the folded plate 30 can freely rotate about side portion 16 without being disengaged therefrom. In this position, the forward end of tab 37 projects against the bent base portion 38 of bent wire trigger arm 31 so as to firmly hold the trigger arm in place in the folded plate member 30.

Cut-out portions 38 and 39 extend inwardly from opposite ends of plate member 30 through the contoured portions 32 and 33. These wedge-shaped or trapezoidal-shaped cut-outs portions 38 and 39 extend longitudinally toward one another and expose a portion of the side portion 16 when the bent plate 30 is secured thereto. Thus, as best illustrated in FIG. 4, the top of side portion 16 is exposed through plate 30 when the plate hangs on side portion 16 with trigger arm 31 suspended downward into the area between the set trap frames 1 and 2. If plate 30 is rotated about side portion 16, as by an animal moving through the trap and pushing trigger arm 31, the trigger arm and plate 30 are caused to rotate and thereby push the notch 26 in latch 5 off that portion 16 so that the jaws 1 and 2 are freed to snap together and trap the animal.

From the foregoing description, it will be readily understood that the trigger mechanism comprising plate 30 and trigger arm 31 is easily assembled by simply folding the plate with the trigger arm extending through holes 34 and 36. In addition, it will be appreciated that if the trigger arm 31 breaks, it can easily be replaced by unfolding or unbending plate 30, inserting a new trigger arm, and refolding or rebending the plate about side portion 16. There are no rivets or other fastening mechanism and the sleeve portion is made up of a single member, namely plate 30.

It will be appreciated that the latch mechanism, when released by the trigger mechanism, is forced upwardly from side portion 16 by the bent plate 30 to enable the jaws of the trap to swing shut on whatever disturbed the trigger. The cut-away portions 38 and 39 in plate 30 facilitate setting of the trap by permitting slot 26 to engage side portion 16 and, in addition, to facilitate actuation of the trap permitting the non-cut-away portion of plate 30 to displace the latch 5 from side portion 16 when the trigger mechanism is rotated.

As a further feature of the instant inventive concepts, the trigger mechanism is preferably designed such that the latch arm 5 will be released whether the animal engages the trigger arm 31 in a manner directly perpendicular to the path of travel through the trap thereby rotating the plate 30 around the side portion 16 in a conventional manner, or brushes against the outer side of either prong of the trigger arm 31 as it passes through the trap. This capability is provided by (1) contouring the opposite end portions 32 and 33 of the plate 30 so as to form the concave partial cylindrical portions of an internal diameter somewhat larger than the external diameter of the side portion 16 of the jaw 2 as seen best in FIG. 5, and (2) forming the cut-out portions 38 and 39 with diverging side portions as clearly seen in FIGS. 2 and 4 such that the base portions 38a and 39a thereof are slightly wider than the thickness of the latch arm 5. With this construction, a rocking of the trigger mechanism from side to side by an animal brushing against one of the prongs of the trigger arm 31 will release the latch arm 5 and cause the trap to spring. If the end portions 32 and 33 were contoured to rather snugly rotate about the side portion 16 of the trap, this rocking action would be precluded. Similarly, if the cut-out portions 38 and 39 were rectangular rather than trapezoidal in shape, a rocking of plate 30 would not necessarily release the latch arm 5 which would tend to bind in the cut-out portions. Thus, by the particular construction shown, a somewhat universal trigger operation is provided.

In the drawings, the jaws are illustrated as being approximately square in shape with straight side portions and with a length approximately equal to the width of the jaws. The dimensions of the spring are such that it will fit into a flat position between the opposite side of the jaws when the spring is in its sprung position. However, the size and shape of the jaws can be varied, depending upon the purpose for which the trap is intended. Although cold rolled steel is the preferred material to be employed for all of the parts, other materials may certainly be employed.

While we have described and illustrated a specific embodiment of our invention, it will be clear that variations of the details of construction which are specifically illustrated and described may be resorted to without departing from the true spirit and scope of the invention as defined in the appended claims.

We claim:

1. An animal trap comprising:

two similar frames, each having opposite side portions and connecting end portions;

pivot means pivotally connecting end portions of said frames together intermediate said side portions;

spring means for swinging said frames relative to one another about their pivots from a set position in which an upper side portion of one frame is adjacent an upper side portion of the other frame to a closed position in which said upper side portion of each frame is adjacent a lower side portion of the other frame;

a latch arm member pivotally carried on said upper side portion of said one of said frames and having at least one notch defined in an edge of said latch arm and adapted to receive said upper side portion of said other frame in said at least one notch to hold said frames in a set position; and a trigger mechanism pivotally carried on said upper side portion of the other frame and having a portion engaging said latch arm to release said other frame from said selected notch and thereby allow said latch member to swing away from said other frame and release said frames; wherein said trigger mechanism comprises only first and second members, said first member comprising a plate having opposite longitudinally-spaced ends contoured to circumscribe said upper side portion of said other frame and having a pair of through-holes defined therein to define a transversely-extending center line of said plate, said second member comprising a two-pronged trigger arm comprising a bent wire with each prong extending through a respective one of said pair of holes, said plate being folded along said transversely-extending center line such that said upper side portion of said other frame is rotatably engaged between said contoured ends and said bent wire is engaged by said folded plate.

2. The animal trap according to claim 1 further comprising wedge means defined as a cut portion of said plate for holding said bent wire secured in position in the folded plate.

3. The animal trap according to claim 2 wherein said wedge means is in the form of a flap cut in said plate and bent out of plan to project towards said transversely-extending center line to wedge said bent wire against the folded plate along said center line.

4. The animal trap according to claims 1 or 3 wherein cut-away portions are provided in opposite longitudinally-spaced ends of said plate to define a slot though said trigger mechanism which exposes a length of said upper side portion of said upper frame when the plate is folded to engage that upper side portion, the exposed length of said upper side portion being engaged by said notch in said latch arm in the set position of the trap.

5. The animal trap according to claim 1 wherein said pair of holes are countersunk from a side of said plate which is interiorly disposed when the plate is folded to engage the upper side portion of said other frame.

6. The animal trap according to claim 1 wherein said latch arm includes a plurality of notches defined in said edge of said latch arm, each notch being adapted to receive said upper side portion of said other frame to hold said frames in a set position at different spring tensions.

7. The animal trap according to claim 4 wherein said cut-away portions of said plate are trapezoidal in shape, the smaller base of each trapezoid being closer to said center line of said plate and being slightly wider than the width of said latch arm, and said contoured ends of said plate together define a substantially cylindrical journal having an internal diameter somewhat larger than the outside diameter of said upper side portion of said other frame to permit a side-to-side rocking of said plate about said side portion.

8. For use with an animal trap of the type wherein first and second frame members are spring-biased to a closed position and are maintained in a set position by means of a latch member pivotally secured to said first frame and releaseably engaging said second frame, said trap being releasable from its set position by a trigger mechanism rotatably secured to said second frame, an improved trigger mechanism comprising:

a plate having opposite longitudinally-spaced ends contoured to circumscribe said second frame member and having a pair of through-holes defined therein to define a transversely-extending center line of said plate, and a further member comprising a two-pronged trigger arm in the form of a bent wire with each prong extending through a respective one of said pair of through-holes, said plate being folded along said transversely-extending center line such that the folded plate rotatably engages said second frame member between said contoured ends and such that said bent wire is engaged by the folded plate.

9. The combination according to claim 8 further comprising wedge means defined as a cut portion of said plate for holding said bent wire secured in position in the folded plate.

10. The combination according to claim 9 wherein said wedge means is in the form of a flap cut in said plate and bent out of plane to project towards said transversely-extending center line to wedge said bent wire against the folded plate along said center line.

11. The combination according to claims 8 or 10 wherein cut-away portions are provided in opposite longitudinally- spaced ends of said plate to define a slot through said trigger mechanism which exposes a length of said second frame through said folded plate, the exposed length of said second frame being engaged by said latch member by means of a notch defined in said latch member to hold the frame in its set position.

12. The animal trap according to claim 11 wherein said cut-away portions of said plate are trapezoidal in shape, the smaller base of each trapezoid being closer to said center line of said plate and being slightly wider than the width of said latch member, and said contoured ends of said plate together define a substantially cylindrical journal having an internal diameter somewhat larger than the outside diameter of said upper side portion of said other frame to permit a side-to-side rocking of said plate about said side portion.

* * * * *